(12) United States Patent
Lee et al.

(10) Patent No.: US 11,296,335 B2
(45) Date of Patent: Apr. 5, 2022

(54) FUEL CELL SYSTEM AND METHOD OF OPERATING SAME

(71) Applicants: HYUNDAI MOTOR COMPANY, Seoul (KR); KIA MOTORS CORPORATION, Seoul (KR)

(72) Inventors: Jin Hun Lee, Yongin-si (KR); Oh Tak Kwon, Yongin-si (KR); Wook Il Jang, Yongin-si (KR); Hun Woo Park, Namyangju-si (KR); Tae Geun Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/870,378

(22) Filed: May 8, 2020

(65) Prior Publication Data
US 2021/0028468 A1   Jan. 28, 2021

(30) Foreign Application Priority Data
Jul. 23, 2019  (KR) ........................ 10-2019-0089096

(51) Int. Cl.
*H01M 8/04029* (2016.01)
*H01M 8/0432* (2016.01)
*H01M 8/04701* (2016.01)

(52) U.S. Cl.
CPC ... *H01M 8/04029* (2013.01); *H01M 8/04358* (2013.01); *H01M 8/04723* (2013.01); *H01M 8/04731* (2013.01)

(58) Field of Classification Search
None
See application file for complete search history.

(56) References Cited

U.S. PATENT DOCUMENTS

2016/0164117 A1*  6/2016  Na ........................... B60L 58/34
                                                       429/429
2017/0062846 A1*  3/2017  Kim .................. H01M 8/04044

* cited by examiner

*Primary Examiner* — Haroon S. Sheikh
(74) *Attorney, Agent, or Firm* — Lempia Summerfield Katz LLC

(57) ABSTRACT

A fuel cell system comprising: a first line configured to pass through a fuel cell stack and allow a coolant to circulate therein; a pump provided in the first line; a second line having one end connected to the first line at a first point positioned between an outlet of the pump and the fuel cell stack, and the other end connected to the first line at a second point positioned between an inlet of the pump and the fuel cell stack; a heater provided in the second line to heat the coolant flowing along the second line; and a third line configured to pass through an air conditioning unit, connected to the first line between the first point and an outlet of the fuel cell stack, and configured to allow a part of the coolant to circulate therein.

18 Claims, 5 Drawing Sheets

FUEL CELL SYSTEM AND METHOD OF OPERATING SAME

CROSS-REFERENCE TO RELATED APPLICATIONS

This application claims priority to and the benefit of Korean Patent Application No. 10-2019-0089096, filed on Jul. 23, 2019, the entire contents of which are incorporated herein by reference.

FIELD

The present disclosure relates to a fuel cell system and a method of operating the same.

BACKGROUND

The statements in this section merely provide background information related to the present disclosure and may not constitute prior art.

A fuel cell system refers to a system that continuously produces electrical energy by means of a chemical reaction of continuously supplied fuel. Research and development are consistently performed on the fuel cell system as an alternative capable of solving global environmental issues.

Based on types of electrolytes used for the fuel cell system, the fuel cell system may be classified into a phosphoric acid fuel cell (PAFC), a molten carbonate fuel cell (MCFC), a solid oxide fuel cell (SOFC), a polymer electrolyte membrane fuel cell (PEMFC), an alkaline fuel cell (AFC), a direct methanol fuel cell (DMFC), and the like. Based on operating temperatures, output ranges, and the like as well as types of used fuel, the fuel cell systems may be applied to various application fields related to mobile power, transportation, distributed power generation, and the like.

Among the fuel cells, the polymer electrolyte membrane fuel cell is applied to the field of a hydrogen vehicle (hydrogen fuel cell vehicle) being developed to substitute for an internal combustion engine.

The hydrogen vehicle is configured to produce its own electricity by means of a chemical reaction between hydrogen and oxygen and to travel by operating a motor. Therefore, the hydrogen vehicle includes a hydrogen tank ($H_2$ tank) configured to store hydrogen ($H_2$), a fuel cell system configured to produce electricity by means of an oxidation-reduction reaction between hydrogen and oxygen ($O_2$), various types of devices configured to discharge produced water, a battery configured to store the electricity produced by the fuel cell system, a controller configured to convert and control the produced electricity, and a motor configured to generate driving power.

The fuel cell system broadly includes a fuel cell stack configured to generate electrical energy, a fuel supply device configured to supply fuel (hydrogen) to the fuel cell stack, an air supply device configured to supply oxygen in air which is an oxidant required for an electrochemical reaction in the fuel cell stack, a thermal management system (TMS) configured to remove reaction heat in the fuel cell stack to the outside of the system and control an operating temperature of the fuel cell stack.

As well known, the thermal management system (TMS) may include a TMS line in which a coolant for cooling the fuel cell stack is circulated, a heater installed in the TMS line and configured to heat the coolant, a radiator installed in the TMS line and configured to radiate heat of the coolant to the outside, an air conditioning unit (e.g., a heating heater) installed in the TMS line and configured to cool or heat an interior of a vehicle by using the coolant, and an ion filter configured to filter out ions contained in the coolant passing through the air conditioning unit.

However, in the related art, the coolant circulates along a heating loop that passes through the heater in a state in which a flow of the coolant toward the fuel cell stack is cut off and a flow of the coolant toward the air conditioning unit and the ion filter is cut off during a cold start of the fuel cell system. For this reason, we have discovered that there is a problem in that a low-temperature coolant remaining in the air conditioning unit and the ion filter is introduced into the fuel cell stack immediately after the cold start, and the performance and the operational efficiency of the fuel cell stack deteriorate due to the low-temperature coolant introduced into the fuel cell stack.

In addition, we have found that in the related art, the filtering process by the ion filter (the process of removing ions contained in the coolant) is impossible during the cold start, which causes a problem that makes it difficult to maintain electrical conductivity of the coolant, which is introduced into the fuel cell stack immediately after the cold start, to a predetermined level or lower.

SUMMARY

The present disclosure provides a fuel cell system and a method of operating the same, which are capable of reducing or minimizing a deterioration in performance caused by a low-temperature coolant.

In particular, the present disclosure reduces or minimizes the introduction of a low-temperature coolant into a fuel cell stack immediately after a cold start and thus minimizes a deterioration in performance and operational efficiency caused by the low-temperature coolant.

In addition, the present disclosure may remove ions contained in the coolant during a cold start.

In an exemplary form of the present disclosure, a fuel cell system includes: a first line configured to pass through a fuel cell stack and allow a coolant to circulate therein; a pump provided in the first line and configured to allow the coolant to flow; a second line having one end connected to the first line at a first point positioned between an outlet of the pump and the fuel cell stack, and the other end connected to the first line at a second point positioned between an inlet of the pump and the fuel cell stack; a heater provided in the second line and configured to heat the coolant flowing along the second line; and a third line configured to pass through an air conditioning unit, connected to the first line between the first point and an outlet of the fuel cell stack, and configured to allow a part of the coolant to circulate therein.

This configuration is provided to reduce or minimize the introduction of a low-temperature coolant into the fuel cell stack immediately after the cold start and to minimize a deterioration in performance and operational efficiency caused by the low-temperature coolant.

That is, in the related art, the coolant circulates only along a heating loop that passes through the heater in a state in which a flow of the coolant toward the fuel cell stack is cut off and a flow of the coolant toward the air conditioning unit and the ion filter is cut off during a cold start. For this reason, there is a problem in that a low-temperature coolant stagnating in the air conditioning unit and the ion filter is introduced into the fuel cell stack immediately after the cold start, and the performance and the operational efficiency of the fuel cell stack deteriorate due to the low-temperature coolant introduced into the fuel cell stack.

Furthermore, in the related art, the filtering process by the ion filter (the process of removing ions contained in the coolant) is impossible during the cold start, which causes a problem that makes it difficult to maintain electrical conductivity of the coolant, which is introduced into the fuel cell stack immediately after the cold start, at a predetermined level or lower.

In contrast, according to the present disclosure, the coolant in the system circulates along the heating loop, which passes through the heater, and also circulates through the air conditioning unit and the ion filter in a state in which a flow of the coolant to the fuel cell stack is cut off during the cold start, such that a temperature of the coolant, which circulates through the air conditioning unit and the ion filter during the cold start, may be maintained at a predetermined level or higher. As a result, it is possible to obtain an advantageous effect of minimizing the introduction of the low-temperature coolant into the fuel cell stack immediately after the cold start and reducing or minimizing a deterioration in performance and operational efficiency caused by the low-temperature coolant.

For reference, a section between the first point and the outlet of the fuel cell stack is defined as a section in which the coolant discharged from a coolant discharge port of the fuel cell stack flows before passing through the first point. As an example, one end of the third line is connected to the first line between the pump and the first point, and the other end of the third line is connected to the first line between the pump and the second point.

In addition, the third line may be provided with an ion filter configured to filter out ions contained in the coolant that has passed through the air conditioning unit.

As described above, according to the present disclosure, the coolant circulates (along the heating loop) through the heater in the second line and also circulates along the third line during the cold start in which the supply of the coolant to the fuel cell stack is cut off. As a result, the ion filter provided in the third line may filter out the ions even during the cold start. Therefore, it is possible to obtain an advantageous effect of maintaining the electrical conductivity of the coolant, which is introduced into the fuel cell stack immediately after the cold start, at a predetermined level or lower.

As an example, a first valve may be provided in the first line so as to be positioned at the first point and connected to one end of the second line, and a flow path of the coolant may be switched to the heater or the fuel cell stack by the first valve.

More specifically, when the introduction of the coolant into the fuel cell stack is cut off at the first point by the first valve, the coolant circulates along the second line and the third line.

In addition, according to the present disclosure, the first line may be configured to pass through a radiator arranged between the pump and the outlet of the fuel cell stack, and the fuel cell system may include a fourth line having one end connected to the first line at a front side of the radiator and the other end connected to the first line at a rear side of the radiator.

The first line may be provided with a second valve configured to switch a flow path of the coolant to the radiator or the fuel cell stack. As an example, the second valve may be provided in the first line so as to be positioned between the pump and the radiator and connected to one end of the fourth line and an outlet end of the third line.

In addition, the fuel cell system may include: a temperature measuring unit configured to measure a temperature of the coolant in the first line; and a control unit configured to control an inflow rate of the coolant to be introduced into the fuel cell stack in accordance with the measured temperature of the coolant measured by the temperature measuring unit.

This configuration is provided to reduce or minimize a thermal shock and a deterioration in performance caused by a temperature deviation between the coolant stagnating in the fuel cell stack and the coolant in the third line at a point in time at which the cold start ends.

That is, because the coolant does not flow in the fuel cell stack 10 during the cold start, it is impossible to measure a temperature in the fuel cell stack (a temperature of the coolant). Therefore, if the temperature deviation between the coolant in the third line and the coolant stagnating in the fuel cell stack is high, a thermal shock may occur or a performance may deteriorate due to the temperature deviation between the coolants when the coolant in the third line is introduced into the fuel cell stack immediately after the cold start, even though the temperature of the coolant in the third line is maintained within a predetermined temperature range during the cold start.

In contrast, according to the present disclosure, a temperature of the coolant is measured in the first line, which defines the circulation route in cooperation with the third line, and an inflow rate of the coolant to be introduced into the fuel cell stack is controlled in accordance with the measured temperature of the coolant. As a result, it is possible to obtain an advantageous effect of reducing or minimizing a thermal shock and a deterioration in performance caused by the temperature deviation between the coolant in the third line and the coolant stagnating in the fuel cell stack.

In particular, when the measured temperature of the coolant is lower than a predetermined target temperature, the control unit controls the inflow rate of the coolant so that the inflow rate of the coolant is lower than a predetermined flow rate.

As described above, since the inflow rate of the coolant to be introduced into the fuel cell stack is controlled to be lower than a predetermined flow rate when the measured temperature of the coolant is lower than a predetermined target temperature, it is possible to obtain an advantageous effect of reducing or minimizing a thermal shock and a deterioration in performance caused by the temperature deviation between the coolants (the temperature of the coolant stagnating in the fuel cell stack vs. the temperature of the coolant to be introduced into the fuel cell stack).

As an example, the temperature measuring unit may include at least one of a first temperature sensor configured to measure a temperature of the coolant between the fuel cell stack and the first point (the first valve) or a second temperature sensor configured to measure a temperature of the coolant between the other end of the second line and the pump.

The control unit may be configured to control the inflow rate of the coolant in various ways in accordance with required conditions and design specifications.

As an example, the control unit may control the inflow rate of the coolant to be introduced into the fuel cell stack by adjusting an opening degree (e.g., a valve opening angle) of the first valve.

As another example, the control unit may control the inflow rate of the coolant to be introduced into the fuel cell stack by adjusting a rotational speed (e.g., rpm) of the pump.

As still another example, the control unit may control the inflow rate of the coolant to be introduced into the fuel cell stack by adjusting both the opening degree of the first valve and the rotational speed of the pump.

Another exemplary form of the present disclosure provides a method of operating a fuel cell system including: a first line configured to pass through a fuel cell stack and allow a coolant to circulate therein; a pump provided in the first line and configured to allow the coolant to flow; a second line having one end connected to the first line at a first point positioned between an outlet of the pump and the fuel cell stack, and the other end connected to the first line at a second point positioned between an inlet of the pump and the fuel cell stack; a heater provided in the second line and configured to heat the coolant flowing along the second line; and a third line configured to pass through an air conditioning unit, connected to the first line at a point positioned between the first point and an outlet of the fuel cell stack, and configured to allow the coolant to circulate therein. The method includes: cutting off, by a first valve, the coolant flowing into the fuel cell stack at the first point, and circulating the coolant along the second line and the third line; and cutting off, by the first valve, the coolant flowing into the second line at the first point, and supplying the coolant to the fuel cell stack.

In addition, the method may include: measuring, by a temperature sensor, a temperature of the coolant in the first line before supplying the coolant to the fuel cell stack; and controlling, by a controller, an inflow rate of the coolant to be introduced into the fuel cell stack based on the measured temperature of the coolant.

In one form, the temperature of the coolant may be measured at least one of a position between the fuel cell stack and the first point or a position between the other end of the second line and the pump.

In particular, when the measured temperature of the coolant is lower than the predetermined target temperature, the inflow rate of the coolant to be introduced into the fuel cell stack is controlled to be lower than a predetermined flow rate.

In another form, in controlling the inflow rate of the coolant, the inflow rate of the coolant to be introduced into the fuel cell stack is controlled by adjusting an opening degree (e.g., a valve opening angle) of the first valve.

In other form, the inflow rate of the coolant to be introduced into the fuel cell stack is controlled by adjusting a rotational speed (rpm) of the pump.

As still another example, the inflow rate of the coolant to be introduced into the fuel cell stack is controlled by adjusting both the opening degree of the first valve and the rotational speed of the pump.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
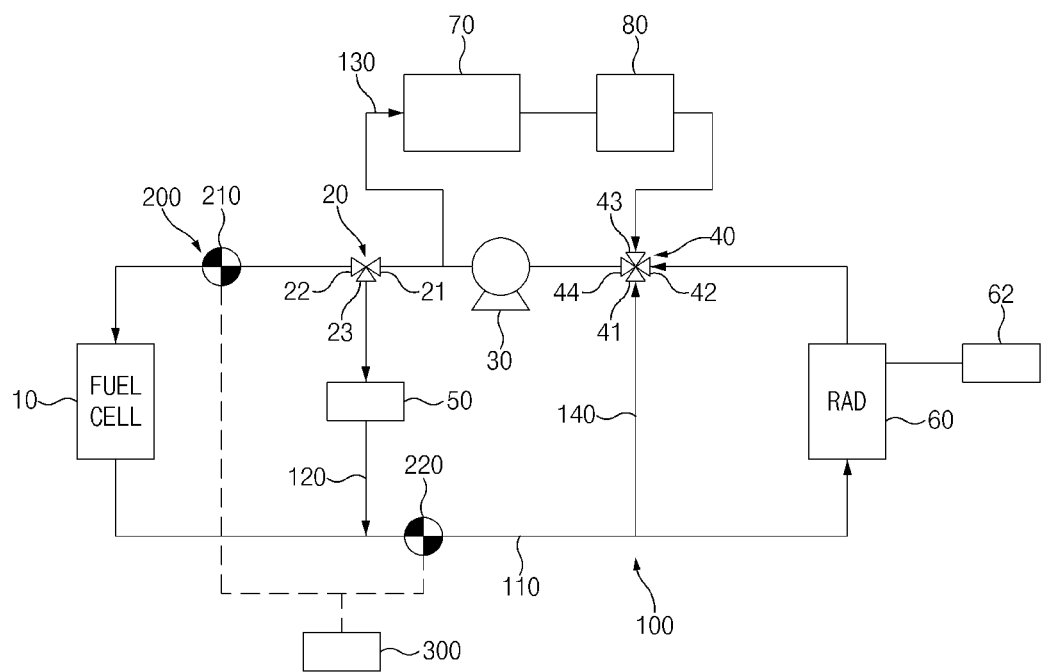
FIG. 1 is a view for explaining a fuel cell system according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

For reference, like reference numerals denote substantially identical elements in the present description, the description may be made under this rule by incorporating the contents illustrated in other drawings, and the contents repeated or determined as being obvious to those skilled in the art may be omitted.

Figure 2:
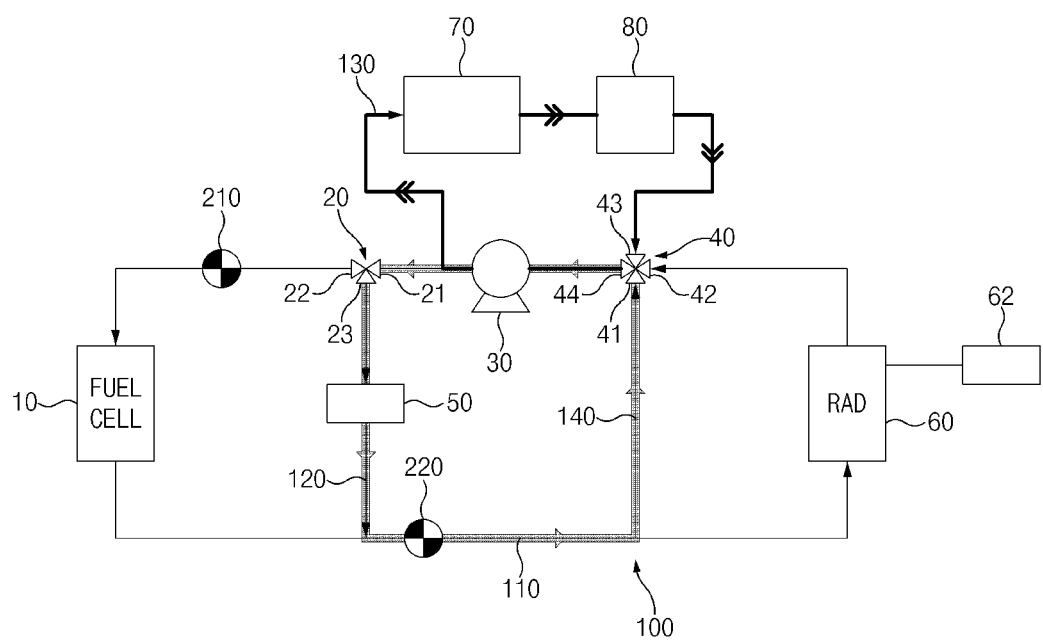
FIG. 2 is a view for explaining a flow of a coolant during a cold start of the fuel cell system according to one form of the present disclosure.
Figure 3:
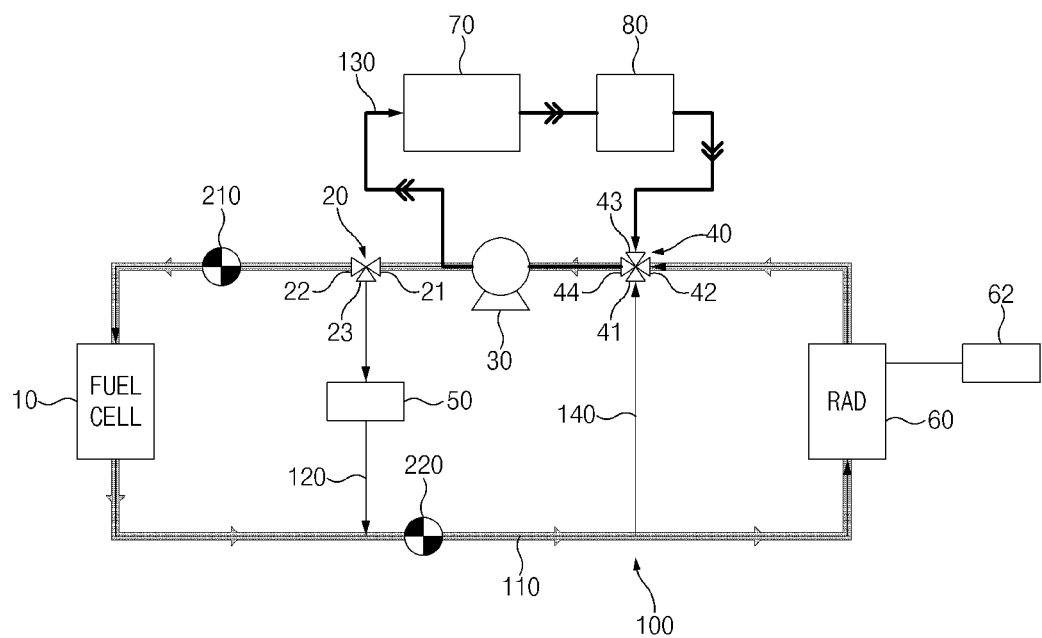
FIG. 3 is a view for explaining a flow of the coolant during an operation of the fuel cell system according to one form of the present disclosure.
Figure 4:
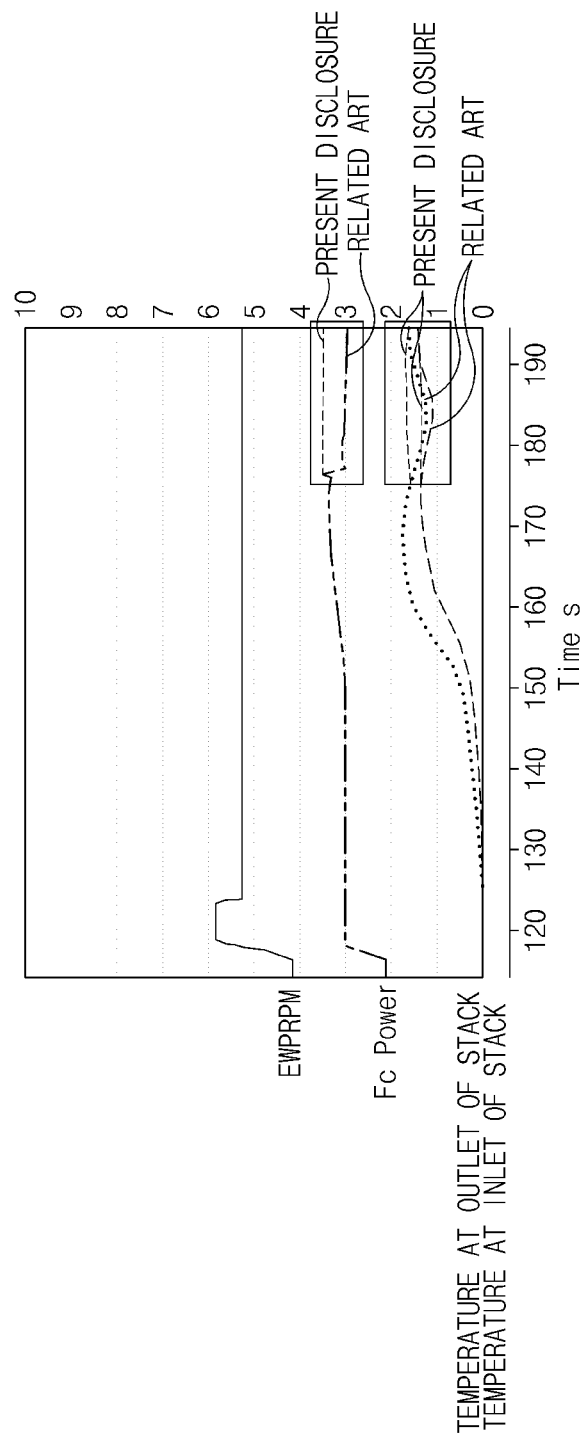
FIG. 4 is a view for explaining an output of the fuel cell stack in accordance with a temperature of the coolant immediately after the cold start of the fuel cell system according to one form the present disclosure.

FIG. 1 is a view for explaining a fuel cell system according to one form of the present disclosure, FIG. 2 is a view for explaining a flow of a coolant during a cold start of the fuel cell system according to one form of the present disclosure, and FIG. 3 is a view for explaining a flow of the coolant during an operation of the fuel cell system in one form of the present disclosure. Further, FIG. 4 is a view for explaining an output of the fuel cell stack in accordance with a temperature of the coolant immediately after the cold start of the fuel cell system according to one form of the present disclosure.

Referring to FIGS. 1 to 4, a fuel cell system 100 according to the present disclosure includes: a first line 110 configured to pass through a fuel cell stack 10 and allow a coolant to circulate therein; a pump 30 provided in the first line 110 and configured to allow the coolant to flow; a second line 120 having one end connected to the first line 110 at a first point positioned between an outlet of the pump 30 and the fuel cell stack 10, and the other end connected to the first line 110 at a second point positioned between an inlet of the pump 30 and the fuel cell stack 10; a heater 50 provided in the second line 120 and configured to heat the coolant flowing along the second line 120; and a third line 130 configured to pass through an air conditioning unit 70, connected to the first line 110 between the first point and an outlet of the fuel cell stack 10, and configured to allow a part of the coolant to circulate therein.

The fuel cell system according to the present disclosure constitutes the TMS line in which water (coolant) may flow while performing heat exchange. The water may be used as a cooling medium or a heating medium in the TMS line.

Further, for convenience of description, the flowing water will be referred to as a coolant in view of a cooling performance of the fuel cell stack 10 which is implemented in a circulation route.

The first line 110 is configured to pass through the fuel cell stack 10, and the coolant circulates along the first line 110.

The first line 110 is configured to define a cooling loop for cooling the coolant or a heating loop for heating (raising a temperature of) the coolant depending on a state of a vehicle. As an example, the first line 110 may be configured to define the heating loop in order to provide a cold start ability in an initial start state, and the first line 110 may be configured to define the cooling loop in order to discharge heat generated in the fuel cell stack 10 to the outside while the vehicle travels.

For reference, the fuel cell stack 10 may have various structures capable of producing electricity by means of an oxidation-reduction reaction between fuel (e.g., hydrogen) and an oxidant (e.g., air).

As an example, the fuel cell stack 10 includes: a membrane electrode assembly (MEA) (not illustrated) having catalyst electrode layers, in which electrochemical reactions occur, at both sides of an electrolyte membrane through which hydrogen ions move; a gas diffusion layer (GDL) (not illustrated) configured to uniformly distribute reactant gases and serve to transfer generated electrical energy; a gasket (not illustrated) and a fastener (not illustrated) configured to maintain leakproof and sealability for the reactant gases and a coolant and maintain an appropriate fastening pressure; and a separator (bipolar plate) (not illustrated) configured to move the reactant gases and the coolant.

More specifically, in the fuel cell stack 10, hydrogen, which is fuel, and air (oxygen), which is an oxidant, are supplied to an anode and a cathode of the membrane electrode assembly, respectively, through flow paths in the separator, such that the hydrogen is supplied to the anode, and the air is supplied to the cathode.

The hydrogen supplied to the anode is decomposed into hydrogen ions (protons) and electrons by catalysts in the electrode layers provided at both sides of the electrolyte membrane. Only the hydrogen ions are selectively delivered to the cathode through the electrolyte membrane which is a positive ion exchange membrane, and at the same time, the electrons are delivered to the cathode through the gas diffusion layer and the separator which are conductors.

At the cathode, there occurs a reaction in which the hydrogen ions supplied through the electrolyte membrane and the electrons supplied through the separator meet oxygen in the air supplied to the cathode by an air supply device to produce water. Due to the movement of the hydrogen ions, the electrons flow through external conductive wires, and an electric current is produced due to the flow of the electrons.

The pump 30 is provided in the first line 110 and configured to force the coolant to flow.

A typical pumping means capable of pumping the coolant may be used as the pump 30, but the present disclosure is not restricted or limited by the type and the properties of the pump 30.

The second line 120 is provided to define the heating loop (heating circulation route) for heating the coolant in cooperation with the first line 110.

More specifically, one end of the second line 120 is connected to the first line 110 at the first point positioned between the outlet of the pump 30 and the fuel cell stack 10, and the other end of the second line 120 is connected to the first line 110 at the second point positioned between the inlet of the pump 30 and the fuel cell stack 10.

In this case, the inlet of the pump 30 is defined as an inlet through which the coolant is introduced into the pump 30. In addition, the outlet of the pump 30 is defined as an outlet through which the coolant passing through the pump 30 is discharged.

Further, a section between the outlet of the pump 30 and the fuel cell stack 10 is defined as a section in which the coolant discharged from the pump 30 flows to a coolant inlet port (not illustrated) of the fuel cell stack 10. In addition, a section between the inlet of the pump 30 and the fuel cell stack 10 is defined as a section in which the coolant discharged from a coolant discharge port (not illustrated) of the fuel cell stack 10 flows to the inlet of the pump 30.

The heater 50 is provided in the second line 120, and the coolant flowing along the second line 120 is heated while passing through the heater 50.

In addition, the first line 110 is provided with a first valve 20 configured to switch a flow path of the coolant to the heater 50 or the fuel cell stack 10.

As an example, the first valve 20 is provided in the first line 110 so as to be positioned at the first point, and one end of the second line 120 is connected to the first valve 20.

Various valve means capable of selectively switching the flow path of the coolant to the heater 50 or the fuel cell stack 10 may be used as the first valve 20.

As an example, a typical three-way valve may be used as the first valve 20. More specifically, the first valve 20 includes a first port 21 connected to the first line 110 so that the coolant pumped by the pump 30 is introduced into the first valve 20, a second port 22 connected to the first line 110 so that the coolant passing through the first valve 20 is introduced into the fuel cell stack 10, and a third port 23 connected to one end of the second line 120.

It is possible to selectively switch the flow path of the coolant to the heater 50 or the fuel cell stack 10 by opening and closing the second port 22 and the third port 23 of the first valve 20. That is, when the second port 22 is opened and the third port 23 is closed, the coolant passing through the first valve 20 is introduced into the fuel cell stack 10. On the contrary, when the third port 23 is opened and the second port 22 is closed, the coolant passing through the first valve 20 is introduced into the heater 50 through the second line 120.

The third line 130 is connected to the first line 110 and provided to define a cooling/heating loop for cooling and heating the air conditioning unit (HVAC (heating, ventilation, and air conditioning) unit) 70 in cooperation with the first line 110.

As an example, the third line 130 may define a loop for the air conditioning unit 70.

More specifically, the third line 130 is connected to the first line 110 between the first point (the point at which one end of the second line is connected to the first line) and the outlet of the fuel cell stack 10, and the third line 130 is configured to allow a part of the coolant to circulate therein.

In this case, a section between the first point and the outlet of the fuel cell stack 10 is defined as a section in which the coolant discharged from the coolant discharge port (not illustrated) of the fuel cell stack 10 flows before passing through the first point.

As an example, one end of the third line 130 is connected to the first line 110 between the pump 30 and the first point, and the other end of the third line 130 is connected to the first line 110 between the pump 30 and the second point.

For reference, in the exemplary form of the present disclosure, there has been described the example in which one end of the third line 130 is connected to the first line 110 between the pump 30 and the first point (at a front side of the pump in a flow direction of the coolant). However, according to another exemplary form of the present disclosure, one end of the third line may be connected to the first line between the pump and a second valve to be described below (at a rear side of the pump in the flow direction of the coolant).

As described above, a branch point at which the third line 130 branches off from the first line 110 is disposed between the first point and the pump 30.

In other words, the branch point (one end of the third line), at which the coolant flowing along the first line 110 flows to the third line 130, is disposed between the first valve 20 and the pump 30, such that the coolant may not only circulate (along the heating loop) via the heater 50 in the second line 120 but also circulate along the third line 130 during the cold start in which the supply of the coolant to the fuel cell stack 10 is cut off (the second port of the first valve is closed). As a result, a temperature of the coolant in the third line 130, which passes through the air conditioning unit 70, may be maintained to a predetermined level or higher during the cold start.

In the related art, because the coolant in the third line 130 cannot circulate during the cold start so that the coolant is in a low temperature state, there is a problem in that the coolant at a low temperature (a temperature at the inlet of the stack), which stagnates in the third line 130, is introduced into the fuel cell stack 10 immediately after the cold start (see the section from 175 to 195 seconds in FIG. 4), and the introduction of the low-temperature coolant into the fuel cell stack 10 causes a problem of a deterioration in output (Fc Power) of the fuel cell stack 10.

In contrast, according to the present disclosure, it is possible to minimize the introduction of the low-temperature coolant into the fuel cell stack 10 immediately after the cold start by maintaining a temperature of the coolant in the third line 130 to a predetermined level or higher during the cold start, and as a result, it is possible to obtain an advantageous effect of minimizing a deterioration in output of the fuel cell stack 10 caused by the low-temperature coolant (see FIG. 4).

In addition, the third line 130 may be provided with an ion filter 80 configured to filter out ions contained in the coolant that has passed through the air conditioning unit 70.

For reference, if electrical conductivity of the coolant is increased due to corrosion, exudation, or the like of the system, electricity flows along the coolant, which causes a problem in that the fuel cell stack 10 is short-circuited or electric current flows toward the coolant. Therefore, low electrical conductivity of the coolant needs to be maintained.

The ion filter 80 is configured to remove the ions contained in the coolant in order to maintain the electrical conductivity of the coolant to a predetermined level or lower.

As described above, according to the present disclosure, the coolant also circulates along the third line 130 while circulating (along the heating loop) via the heater 50 in the second line 120 during the cold start in which the supply of the coolant to the fuel cell stack 10 is cut off (the second port of the first valve is closed), and as a result, the ion filter 80 provided in the third line 130 may filter out (remove) the ions contained in the coolant even during the cold start. Therefore, it is possible to obtain an advantageous effect of maintaining the electrical conductivity of the coolant, which is introduced into the fuel cell stack 10 immediately after the cold start, to a predetermined level or lower.

In addition, according to the present disclosure, the first line 110 is configured to pass through a radiator 60 between the pump 30 and the outlet of the fuel cell stack 10, and the fuel cell system may include a fourth line 140 having one end connected to the first line 110 at a front side of the radiator 60, and the other end connected to the first line 110 at a rear side of the radiator 60.

Referring to FIG. 3, the fourth line 140 is connected to the first line 110 and provided to define a cooling loop for cooling the coolant in cooperation with the first line 110. As an example, one end of the fourth line 140 may be connected to the first line 110 between the pump 30 and the radiator 60, and the other end of the fourth line 140 may be connected to the first line 110 between the coolant discharge port of the fuel cell stack 10 and the radiator 60.

In addition, the first line 110 is provided with a second valve 40 configured to switch a flow path of the coolant to the radiator 60 or the fuel cell stack 10.

As an example, the second valve 40 is provided in the first line 110 so as to be positioned between the pump 30 and the radiator 60, and the second valve 40 is connected to one end of the fourth line 140 and an outlet end (the other end) of the third line 130.

Various valve means capable of selectively switching the flow path of the coolant to the radiator 60 or the fuel cell stack 10 may be used as the second valve 40.

As an example, a typical four-way valve may be used as the second valve 40. More specifically, the second valve 40 includes a first port 41 connected to the fourth line 140, a second port 42 connected to the first line 110 so that the coolant passing through the radiator 60 is introduced into the second valve 40, a third port 43 connected to the other end of the third line 130, and a fourth port 44 connected to the first line 110 so that the coolant passing through the second valve 40 is introduced into the pump 30.

It is possible to selectively switch the flow path of the coolant to the radiator 60 or the fuel cell stack 10 by opening and closing the first port 41 and the second port 42 of the second valve 40. That is, when the first port 41 is opened and the second port 42 is closed, the coolant is introduced into the fuel cell stack 10 without passing through the radiator 60. On the contrary, when the second port 42 is opened and the first port 41 is closed, the coolant is introduced into the fuel cell stack 10 after passing through the radiator 60.

Further, the radiator 60 may be connected to a reservoir 62 configured to store the coolant.

Meanwhile, the fuel cell system according to the present disclosure may include a temperature measuring unit 200 configured to measure a temperature of the coolant in the first line 110, and a control unit 300 configured to control an inflow rate of the coolant to be introduced into the fuel cell stack 10 in accordance with a measured temperature of the coolant measured by the temperature measuring unit 200.

This configuration is provided to minimize a thermal shock and a deterioration in performance caused by a temperature deviation between the coolant stagnating in the fuel cell stack 10 and the coolant in the third line 130 at a point in time at which the cold start ends.

That is, because the coolant does not flow in the fuel cell stack 10 during the cold start, it is impossible to measure a temperature in the fuel cell stack 10 (a temperature of the coolant). Therefore, if the temperature deviation between the coolant in the third line 130 and the coolant stagnating in the fuel cell stack 10 is high, a thermal shock may occur or a performance may deteriorate due to the temperature deviation between the coolants when the coolant in the third line 130 is introduced into the fuel cell stack 10 immediately after the cold start, even though the temperature of the coolant in the third line 130 is maintained within a predetermined temperature range during the cold start.

In contrast, according to the present disclosure, a temperature of the coolant is measured in the first line 110, which defines the circulation route in cooperation with the third line 130, and an inflow rate of the coolant to be introduced into the fuel cell stack 10 is controlled in accordance with the measured temperature of the coolant. As a result, it is possible to obtain an advantageous effect of minimizing a thermal shock and a deterioration in performance caused by the temperature deviation between the coolant in the third line 130 and the coolant stagnating in the fuel cell stack 10.

In particular, when the measured temperature of the coolant is lower than a predetermined target temperature, the control unit 300 controls the inflow rate of the coolant so that the inflow rate of the coolant is lower than a predetermined flow rate.

As described above, since the inflow rate of the coolant to be introduced into the fuel cell stack 10 is controlled to be lower than a predetermined flow rate when the measured temperature of the coolant is lower than a predetermined target temperature, it is possible to obtain an advantageous effect of minimizing a thermal shock and a deterioration in performance caused by the temperature deviation between the coolants (the temperature of the coolant stagnating in the fuel cell stack vs. the temperature of the coolant to be introduced into the fuel cell stack).

As an example, the temperature measuring unit 200 may include any one or both of a first temperature sensor 210 configured to measure a temperature of the coolant between the fuel cell stack 10 and the first point (the first valve) and a second temperature sensor 220 configured to measure a temperature of the coolant between the other end of the second line 120 and the pump 30. Hereinafter, an example in which both the first temperature sensor 210 and the second temperature sensor 220 are used will be described.

The control unit 300 may be configured to control the inflow rate of the coolant in various ways in accordance with required conditions and design specifications.

As an example, the control unit 300 may control the inflow rate of the coolant to be introduced into the fuel cell stack 10 by adjusting an opening degree (e.g., a valve opening angle) of the first valve 20 (for example, by sequentially increasing the opening degree of the first valve) and thus delaying the opening timing of the first valve 20 (the opening timing of the second port).

As another example, the control unit 300 may control the inflow rate of the coolant to be introduced into the fuel cell stack 10 by adjusting a rotational speed (rpm) of the pump 30 (for example, by slowly increasing the rotational speed of the pump in accordance with the measured temperature of the coolant).

As still another example, the control unit 300 may control the inflow rate of the coolant to be introduced into the fuel cell stack 10 by adjusting both the opening degree of the first valve 20 and the rotational speed of the pump 30.

For reference, a range of the opening degree of the first valve 20 and a range of the rotational speed of the pump 30 may be predetermined in accordance with a range of the temperature of the coolant.

For example, the range of the opening degree of the first valve 20 and the range of the rotational speed of the pump 30 are stored in advance in a lookup table for each range of the temperature of the coolant, and the inflow rate of the coolant to be introduced into the fuel cell stack 10 may be quickly controlled based on the information stored in the lookup table and on the measured temperature of the coolant.

Further, control parameters (the opening degree of the first valve and the rotational speed of the pump), which are not stored in advance in the lookup table, may be calculated by interpolation using errors of adjacent relation parameters stored in advance.

Figure 5:
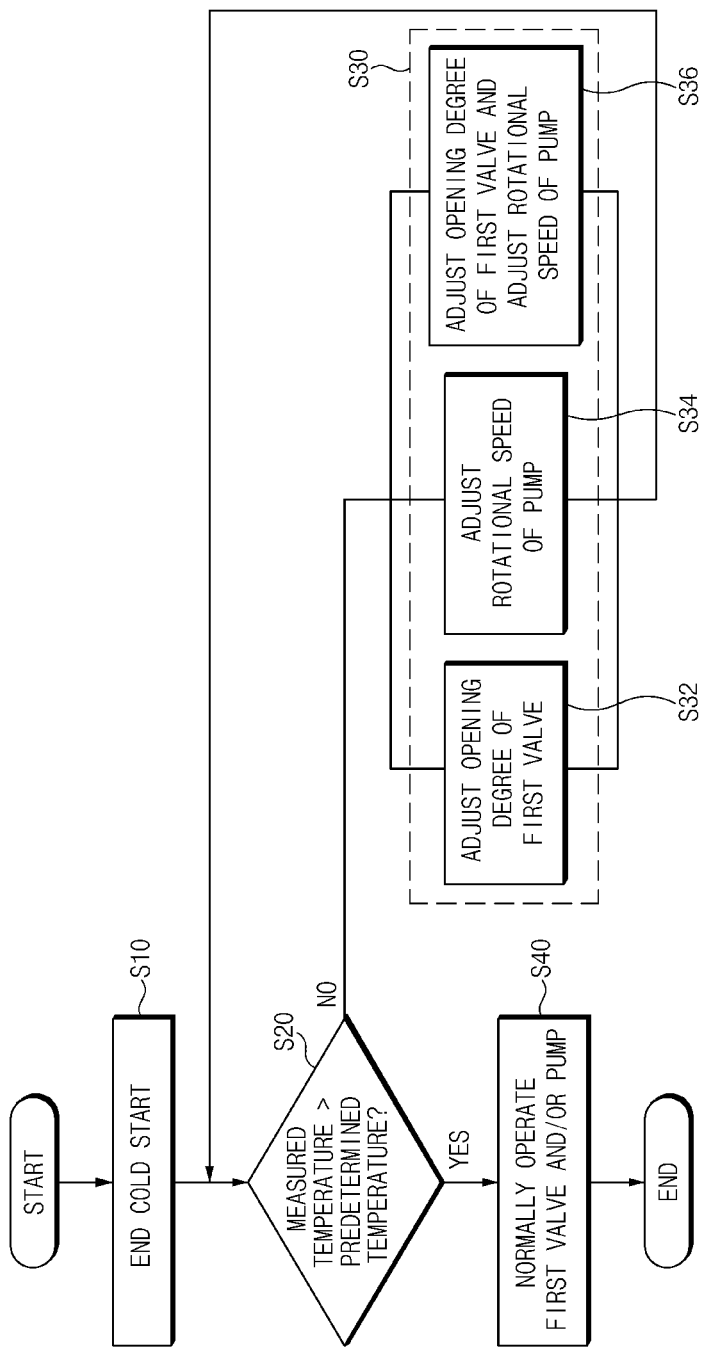
FIG. 5 is a block diagram for explaining a method of operating the fuel cell system according to one form of the present disclosure.

Meanwhile, FIG. 5 is a block diagram for explaining a method of operating the fuel cell system according to one form of the present disclosure. Further, the parts identical and equivalent to the parts in the above-mentioned configuration will be designated by the identical or corresponding reference numerals, and detailed descriptions thereof will be omitted.

Referring to FIGS. 1 to 3, another aspect of the present disclosure provides a method of operating the fuel cell system including: the first line 110 configured to pass through the fuel cell stack 10 and allow the coolant to circulate therein; the pump 30 provided in the first line 110 and configured to allow the coolant to flow; the second line 120 having one end connected to the first line 110 at the first point positioned between the outlet of the pump 30 and the fuel cell stack 10, and the other end connected to the first line 110 at the second point positioned between the inlet of the pump 30 and the fuel cell stack 10; the heater 50 provided in the second line 120 and configured to heat the coolant flowing along the second line 120; and the third line 130 configured to pass through the air conditioning unit 70, connected to the first line 110 between the first point and the outlet of the fuel cell stack 10, and configured to allow the coolant to circulate therein, the method including: a circulation step of circulating the coolant along the second line 120 and the third line 130 in a state in which the introduction of the coolant into the fuel cell stack 10 is cut off at the first point; and a supply step of supplying the coolant to the fuel cell stack 10 in a state in which the introduction of the coolant into the second line 120 is cut off at the first point.

First, the coolant is circulated along the second line 120 and the third line 130 in the state (the cold start state) in which the introduction of the coolant into the fuel cell stack 10 is cut off at the first point (see FIG. 2).

As an example, in the circulation step, the introduction of the coolant into the fuel cell stack 10 may be cut off at the first point by closing the second port 22 of the first valve 20 provided in the first line 110 and opening the third port 23 of the first valve 20, such that the coolant circulates along the second line 120 and also circulates along the third line 130.

As described above, in the circulation step, in the state in which the supply of the coolant to the fuel cell stack 10 is cut off at the first point, the coolant circulates along the second line 120 (the heating loop) and also circulates along the third line 130 (the cooling/heating loop), and as a result, it is possible to maintain the temperature of the coolant in the third line 130, which passes through the air conditioning unit 70, to a predetermined level or higher.

Next, the coolant is supplied to the fuel cell stack 10 in the state (the state immediately after the cold start) in which the introduction of the coolant into the second line 120 is cut off at the first point.

As an example, in the supply step, the introduction of the coolant into the second line 120 is cut off at the first point by opening the second port 22 of the first valve 20 provided in the first line 110 and closing the third port 23 of the first valve 20, and the coolant is supplied to the fuel cell stack 10 at the first point.

Further, in the supply step, the coolant, which circulates along the third line 130, is also supplied to the fuel cell stack 10. Since the temperature of the coolant in the third line 130 is maintained within a predetermined temperature range or higher, it is possible to reduce or minimize the introduction of the low-temperature coolant into the fuel cell stack 10.

In addition, referring to FIG. 5, the method of operating the fuel cell system according to the present disclosure may include: a temperature measuring step of measuring a temperature of the coolant in the first line 110 before supplying the coolant to the fuel cell stack 10; and a control step of controlling an inflow rate of the coolant to be introduced into the fuel cell stack 10 in accordance with the measured temperature of the coolant measured by the temperature measuring step.

As described above, the temperature of the coolant in the first line 110 is measured before supplying the coolant to the fuel cell stack 10, and the inflow rate of the coolant to be introduced into the fuel cell stack 10 is controlled in accordance with the measured temperature of the coolant. As a result, it is possible to obtain an advantageous effect of reducing or minimizing a thermal shock and a deterioration in performance caused by the temperature deviation between the coolant in the third line 130 and the coolant stagnating in the fuel cell stack 10.

More specifically, when the cold start ends (S10), the temperature of the coolant in the first line 110 is measured.

As an example, in the temperature measuring step, the temperature of the coolant may be measured at any one or both of the position between the fuel cell stack 10 and the first point (the first valve) and the position between the other end of the second line 120 and the pump 30.

In the control step, the measured temperature of the coolant is compared with the predetermined target temperature (S20).

In particular, when the measured temperature of the coolant is lower than the predetermined target temperature, the control step controls the inflow rate of the coolant so that the inflow rate of the coolant is lower than the predetermined flow rate (S30).

As described above, since the inflow rate of the coolant to be introduced into the fuel cell stack 10 is controlled to be lower than a predetermined flow rate when the measured temperature of the coolant is lower than a predetermined target temperature, it is possible to obtain an advantageous effect of reducing or minimizing a thermal shock and a deterioration in performance caused by the temperature deviation between the coolants (the temperature of the coolant stagnating in the fuel cell stack vs. the temperature of the coolant to be introduced into the fuel cell stack).

As an example, the control step may control the inflow rate of the coolant to be introduced into the fuel cell stack 10 by adjusting the opening degree of the first valve 20 (for example, by sequentially increasing the opening degree of the first valve) and thus delaying the opening timing of the first valve 20 (the opening timing of the second port) (S32).

As another example, the control step may control the inflow rate of the coolant to be introduced into the fuel cell stack 10 by adjusting the rotational speed (rpm) of the pump 30 (for example, by slowly increasing the rotational speed of the pump in accordance with the measured temperature of the coolant) (S34).

As still another example, the control step may control the inflow rate of the coolant to be introduced into the fuel cell stack 10 by adjusting both the opening degree of the first valve 20 and the rotational speed of the pump 30 (S36).

For reference, a range of the opening degree of the first valve 20 and a range of the rotational speed of the pump 30 may be predetermined in accordance with a range of the temperature of the coolant.

For example, the range of the opening degree of the first valve 20 and the range of the rotational speed of the pump 30 are stored in advance in a lookup table for each range of the temperature of the coolant, and the inflow rate of the coolant to be introduced into the fuel cell stack 10 may be quickly controlled based on the information stored in the lookup table and on the measured temperature of the coolant.

Further, control parameters (the opening degree of the first valve and the rotational speed of the pump), which are not stored in advance in the lookup table, may be calculated by interpolation using errors of adjacent relation parameters stored in advance.

In contrast, when it is detected that the measured temperature of the coolant is higher than the predetermined target temperature, the opening degree of the first valve and the rotational speed of the pump 30 are adjusted to meet preset normal conditions.

According to the present disclosure as described above, it is possible to obtain an advantageous effect of reducing or minimizing a deterioration in performance caused by the low-temperature coolant during the cold start.

In particular, according to the present disclosure, it is possible to obtain an advantageous effect of reducing or minimizing the introduction of the low-temperature coolant into the fuel cell stack immediately after the cold start and thus reducing or minimizing a deterioration in performance and operational efficiency caused by the low-temperature coolant.

In addition, according to the present disclosure, it is possible to obtain an advantageous effect of maintaining electrical conductivity of the coolant, which is introduced into the fuel cell stack immediately after the cold start, to a predetermined level or lower by removing the ions contained in the coolant during the cold start.

While the present disclosure has been described above with reference to the exemplary forms, it may be understood by those skilled in the art that the present disclosure may be variously modified and changed without departing from the spirit and scope of the present disclosure.

What is claimed is:
1. A fuel cell system comprising:
a first line configured to pass through a fuel cell stack and allow a coolant to circulate therein;
a pump provided in the first line and configured to allow the coolant to flow;
a second line having a first end connected to the first line at a first point positioned between an outlet of the pump and the fuel cell stack, and a second end connected to the first line at a second point positioned between an inlet of the pump and the fuel cell stack;
a heater provided in the second line and configured to heat the coolant flowing along the second line;
a third line configured to pass through an air conditioning unit, connected to the first line between the first point and an outlet of the fuel cell stack, and configured to allow the coolant to circulate therein;
a temperature measuring unit configured to measure a temperature of the coolant circulating along the second and third lines in a cold start state; and
a control unit configured to:
block the coolant from flowing into the second line when the cold start state ends,
compare the measured temperature of the coolant with a target temperature, and
control an inflow rate of the coolant to be supplied to the fuel cell stack from the third line when the measured temperature of the coolant is lower than the target temperature.
2. The fuel cell system of claim 1, wherein a first end of the third line is connected to the first line between the pump and the first point, and a second end of the third line is connected to the first line between the pump and the second point.

3. The fuel cell system of claim 1, comprising:
an ion filter provided in the third line and configured to filter out ions contained in the coolant passing through the air conditioning unit.

4. The fuel cell system of claim 1, comprising:
a first valve provided in the first line at the first point, connected to the first end of the second line, and configured to switch a flow path of the coolant to the heater or the fuel cell stack.

5. The fuel cell system of claim 4, wherein when the coolant flowing into the fuel cell stack is blocked at the first point by the first valve, the coolant circulates along the second line and the third line.

6. The fuel cell system of claim 4, wherein when the measured temperature of the coolant is lower than the target temperature, the control unit is configured to control the inflow rate of the coolant so that the inflow rate of the coolant is lower than a predetermined flow rate.

7. The fuel cell system of claim 6, wherein the control unit is configured to control the inflow rate of the coolant by adjusting an opening degree of the first valve.

8. The fuel cell system of claim 6, wherein the control unit is configured to control the inflow rate of the coolant by adjusting a rotational speed of the pump.

9. The fuel cell system of claim 6, wherein the control unit is configured to control the inflow rate of the coolant by adjusting an opening degree of the first valve and a rotational speed of the pump.

10. The fuel cell system of claim 1, wherein the temperature measuring unit comprises at least one of a first temperature sensor configured to measure a temperature of the coolant between the fuel cell stack and the first point or a second temperature sensor configured to measure a temperature of the coolant between the second end of the second line and the pump.

11. The fuel cell system of claim 1, further comprising: a fourth line having a first end connected to the first line at a front side of a radiator, and a second end connected to the first line at a rear side of the radiator,
wherein the first line passes through the radiator arranged between the pump and the outlet of the fuel cell stack.

12. The fuel cell system of claim 11, further comprising:
a second valve provided in the first line and positioned between the pump and the radiator, wherein the second valve is connected to the first end of the fourth line and an outlet end of the third line, and configured to switch a flow path of the coolant to the radiator or the fuel cell stack.

13. A method of operating a fuel cell system, where the fuel cell system includes: a pump to circulate a coolant along a first line passing through a fuel cell stack; a second line having a first end connected to the first line at a first point positioned between an outlet of the pump and the fuel cell stack, and a second end connected to the first line at a second point positioned between an inlet of the pump and the fuel cell stack; a heater provided in the second line to heat the coolant flowing along the second line; and a third line passing through an air conditioning unit and connected to the first line at a point positioned between the first point and an outlet of the fuel cell stack so as to allow the coolant to circulate therein, the method comprising:
cutting off, by a first valve, the coolant flowing into the fuel cell stack at the first point, and circulating the coolant along the second line and the third line in a cold start state;
measuring, by a temperature sensor, a temperature of the coolant circulating along the second and third lines;
cutting off, by the first valve, the coolant flowing into the second line at the first point after the cold start state ends;
comparing, by a controller, the measured temperature of the coolant with a target temperature; and
in response to determining that the measured temperature of the coolant is lower than the target temperature, controlling, by the controller, an inflow rate of the coolant to be supplied to the fuel cell stack from the third line.

14. The method of claim 13, wherein the temperature of the coolant is measured at least one of a position between the fuel cell stack and the first point or a position between the second end of the second line and the pump.

15. The method of claim 13, wherein when the measured temperature of the coolant is lower than the target temperature, the inflow rate of the coolant to be introduced into the fuel cell stack is controlled to be lower than a predetermined flow rate.

16. The method of claim 15, wherein in controlling the inflow rate of the coolant, the inflow rate is controlled by adjusting an opening degree of the first valve provided in the first line at the first point and connected to the first end of the second line.

17. The method of claim 15, wherein the inflow rate of the coolant is controlled by adjusting a rotational speed of the pump.

18. The method of claim 15, wherein the inflow rate of the coolant is controlled by adjusting a rotational speed of the pump and adjusting an opening degree of the first valve provided at the first point and connected to the first end of the second line.

* * * * *